United States Patent
Lan (10) Patent No.: US 9,363,703 B2
(45) Date of Patent: Jun. 7, 2016

(54) OFDMA SUBCHANNEL ASSIGNMENT

(71) Applicant: VIXS SYSTEMS INC., Toronto (CA)

(72) Inventor: Cheng-Chou Lan, Los Angeles, CA (US)

(73) Assignee: VIXS Systems Inc., Toronto (CA)

( * ) Notice: Subject to any disclaimer, the term of this patent is extended or adjusted under 35 U.S.C. 154(b) by 191 days.

(21) Appl. No.: 14/217,615

(22) Filed: Mar. 18, 2014

(65) Prior Publication Data

US 2015/0271699 A1 Sep. 24, 2015

(51) Int. Cl.
*H04W 28/02* (2009.01)
*H04W 72/08* (2009.01)
*H04L 5/00* (2006.01)

(52) U.S. Cl.
CPC ............ *H04W 28/0257* (2013.01); *H04L 5/00* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 2003/0130824 A1* | 7/2003 | Antoine | ................. | H04L 5/006 702/189 |
| 2003/0185311 A1* | 10/2003 | Kim | .................... | H04L 27/2608 375/260 |
| 2004/0120347 A1* | 6/2004 | Lee | ....................... | H04J 3/1682 370/468 |
| 2005/0238109 A1 | 10/2005 | Koga et al. | | |
| 2006/0083157 A1* | 4/2006 | Cheng | .................. | H04L 5/0037 370/208 |
| 2006/0126749 A1* | 6/2006 | Armour | ................ | H04L 5/0007 375/260 |
| 2006/0280113 A1 | 12/2006 | Huo | | |
| 2007/0147530 A1* | 6/2007 | Li | ........................ | H04L 27/2608 375/261 |
| 2009/0003468 A1* | 1/2009 | Karabulut | ............ | H04L 5/0007 375/260 |
| 2009/0052383 A1* | 2/2009 | Moulin | ............... | H04L 27/2608 370/329 |
| 2014/0269362 A1 | 9/2014 | Azizi et al. | | |
| 2014/0269873 A1* | 9/2014 | Tahir | ................... | H04W 52/241 375/227 |

OTHER PUBLICATIONS

Non-Final Office Action mailed Nov. 24, 2015 in U.S. Appl. No. 14/217,616, 36 pages.

* cited by examiner

*Primary Examiner* — Benjamin H Elliott, IV
*Assistant Examiner* — Eric Nowlin (57) ABSTRACT

A device includes a signaling interface to receive OFDM signaling for an OFDM channel from multiple transmit nodes, an OFDM receiver to process the OFDM signaling, and a channel allocation module. The channel allocation module allocates subchannels of the channel among transmit nodes by: determining, for each transmit node, a corresponding SNR for each of the subchannels; assigning to each transmit node a corresponding subset of buckets of a set of buckets, the number of buckets in the subset based on a data rate requirement of the transmit node; distributing subchannels among the buckets based on the SNRs of the subchannels; and, for each transmit node, allocating to the transmit node the subchannels distributed to the subset of buckets assigned to the transmit node. The device further includes an OFDM transmitter to transmit configuration information to the transmit nodes, the configuration information representing the allocation of the subchannels.

18 Claims, 6 Drawing Sheets

OFDMA SUBCHANNEL ASSIGNMENT

CROSS-REFERENCE TO RELATED APPLICATIONS

The present application is related to U.S. patent application Ser. No. 14/217,616, entitled "PILOT SELECTION FOR OFDMA CARRIER TRACKING" and filed on even date herewith, the entirety of which is incorporated by reference herein.

FIELD OF THE DISCLOSURE

The present disclosure generally relates to orthogonal frequency division multiplexing (OFDM) systems and more particularly to multi-access OFDM (OFDMA) systems.

BACKGROUND

Orthogonal frequency-divisional multiplexing (OFDM) signaling schemes often are used in wired and wireless systems to facilitate high-bandwidth data transmission. Generally, OFDM is a multi-carrier modulation technique that partitions the bandwidth of an OFDM channel into a plurality of orthogonal subchannels, which are also commonly referred to as tones, bins, and subbands. Each subchannel is associated with a subcarrier that may be modulated with data such that N modulation symbols may be transmitted on the N subchannels for each OFDM symbol period. OFDM may be used in systems whereby multiple transmit nodes concurrently transmit to a receive node. Such schemes are referred to as multiple-access OFDM, or OFDMA. In OFDMA systems, each transmit node is assigned a corresponding number of the subchannels of each OFDM symbol period, during which the transmit node can modulate a corresponding OFDM symbol onto each of its allocated subchannels.

To facilitate accurate decoding of the symbols at the receive node, OFDM makes use of pilot tones, which are used by the receive node to estimate phase noise, frequency offset, and other channel conditions, and from these estimated channel conditions tune the symbol decoding process. However, while the use of pilot tones facilitates accurate characterization of the channel conditions, each pilot tone displaces actual data in an OFDM symbol, and thus a balance between robust decoding and data throughput typically is sought in selecting the number of pilot tones to be used in an OFDM symbol. In many conventional OFDM-based systems, such as IEEE 802.11 (WiFi) and IEEE 802.16 (WiMAX) wireless systems and Multimedia over Coaxial Alliance (MoCA) systems, the subchannels to be used for pilots typically are evenly distributed across the OFDM symbol in an attempt to broadly characterize the entire channel in view of the frequency-dependent fading often present in such systems, and in a manner independent of the allocation or use of the subchannels among the various transmit nodes.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-6 illustrate example techniques for efficient subchannel allocation and pilot selection for multiple transmit nodes in a multiple-access orthogonal frequency division multiplexing (OFDMA) system. In at least one embodiment, an OFDM transceiver device, operating as a control node, cooperates with a plurality of transmit nodes to estimate channel conditions for an OFDM channel to be used by the plurality of transmit nodes for transmission of data to the OFDM transceiver device. As part of this channel estimation, the OFDM transceiver device determines a signal-to-noise ratio (SNR) vector for each transmit node. This SNR vector includes a corresponding SNR for each of the subchannels of the OFDMA channel for the corresponding transmit node. The OFDM transceiver device then employs a bucket-based allocation scheme to allocate the subchannels among the transmit nodes based on the SNR vectors. To this end, each transmit node is assigned one or more buckets based on the data rate requirement of the transmit node. The subchannels are then distributed among the buckets in an order based on the SNR vectors and in a manner that attempts to equally bit load each bucket. With the subchannels distributed among the buckets, the buckets can be equalized such that the final total bit loading of each bucket is equal to the lowest total bit loading among the buckets before equalization. To achieve this bit loading equalization, for those buckets having an initial total bit loading higher than the lowest total bit loading, the bit loading of one or more of the subchannels with the highest SNRs in the bucket can be reduced (and thus reducing the SNRs of the affected subchannels). After distribution and equalization, each transmit node is allocated those subchannels that were distributed to the one or more buckets assigned to the transmit node. The OFDM transceiver device then may transmit control information upstream to the transmit nodes, whereby the control information includes information identifying the allocation of subchannels among the transmit nodes and the bit loading to be implemented for each subchannel. The transmit nodes then may configure their OFDM transmitters to transmit OFDM signaling in accordance with the subchannel allocation and subchannel bit loading designated for the transmit node.

Further, in at least one embodiment, the OFDMA system described herein employs pilots and other training sequences to characterize the subchannels of the OFDMA symbol and to facilitate OFDM symbol decoding accordingly. In view of the bucket-based subchannel allocation approach, subchannels can be selected for use as pilots (that is, for transmitting pilot tones) based on the SNRs of the subchannels in each bucket. In this approach, a maximum number of pilots per bucket is determined, and a number of pilots up to this maximum number can be selected in each bucket from the subchannels having the highest SNRs in the bucket. Thus, each bucket can be accorded its own pilot subchannels, rather than evenly distributing the pilots across the entire OFDM channel on a channel-wide basis. Moreover, by using the subchannels with the highest SNRs in each bucket for transmitting pilot tones, a more effective estimation of subchannel gain and phase shift can be obtained.

For ease of illustration, the techniques of the present disclosure are described in an example context of a Multimedia over Coaxial Alliance (MoCA)-compliant system that utilizes network of coaxial cables and splitters to conduct OFDM signaling between nodes. However, the disclosed techniques are not limited to this example implementation, but instead may be implemented in any of a variety of wired or wireless contexts utilizing reverse OFDMA signaling, such as, for example, a wireless system based on an IEEE 802.11 standard or an IEEE 802.16 standard.

Figure 1:
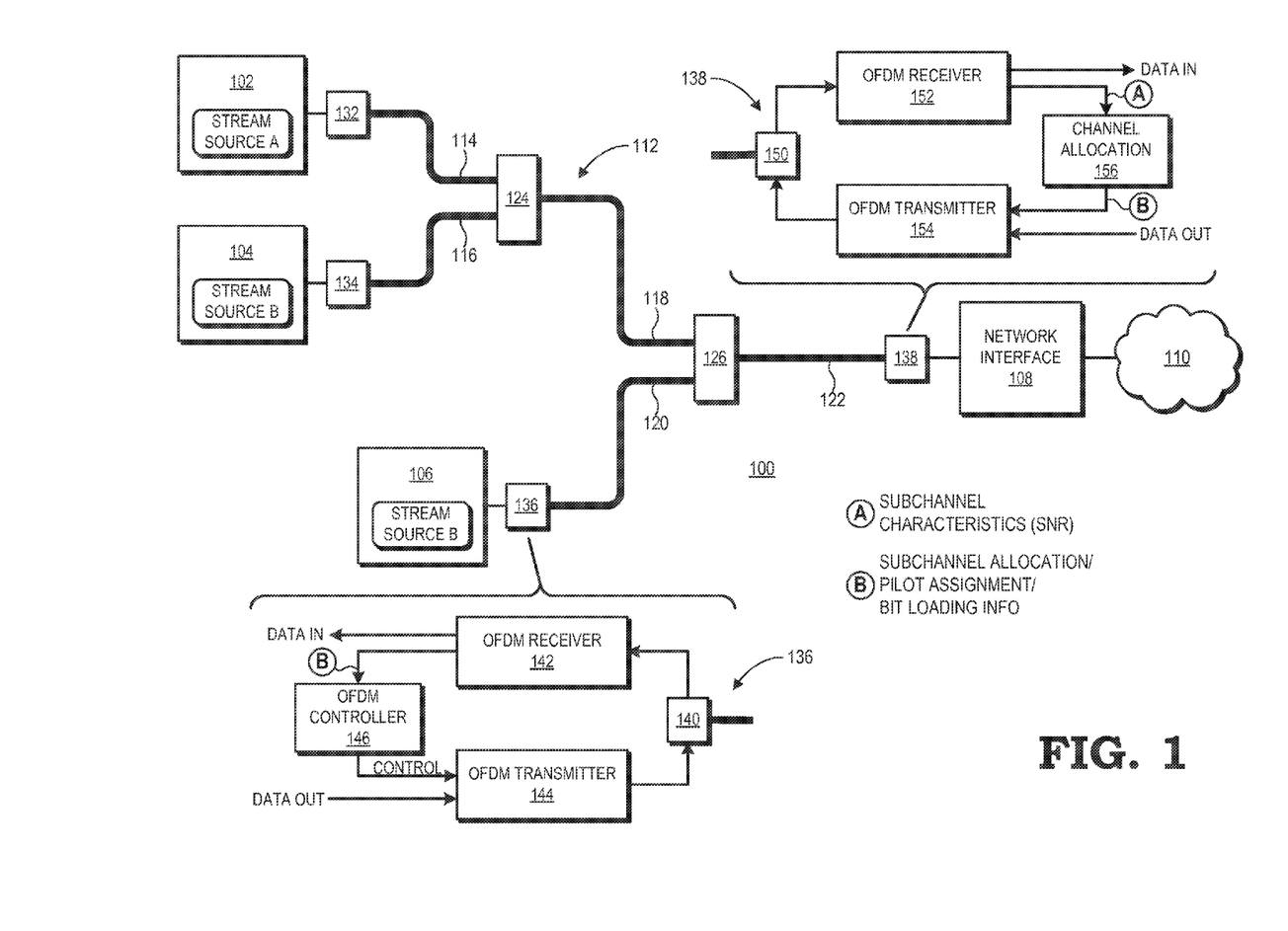
FIG. 1 is a diagram illustrating an OFDMA-based system in accordance with at least one embodiment of the present disclosure.

FIG. 1 illustrates an example networked system 100 utilizing a MoCA architecture to communicate data between a plurality of networked devices. The networked system 100 includes a plurality of user devices 102, 104, 106 connected to a network interface 108, which in turn is connected to an external network 110. To illustrate, the networked system 100 can comprise a home network, whereby the user devices 102, 104, 106 comprise set-top boxes, televisions, computers, security cameras, and the like, and the network interface 108 is an optical network termination (ONT), cable modem, or other network gateway between the home network and a service provider's network.

In the depicted example, the user devices 102, 104, 106 and the network interface 108 are connected via a coaxial cable network 112 comprising a plurality of coaxial cable segments 114, 116, 118, 120, 122 and splitters 124, 126 connected in the manner depicted. Typically, the user devices 102, 104, 106 and network interface 108 are configured to communicate via Ethernet-based signaling or other conventional digital-based signaling. Accordingly, the networked system 100 further implements MoCA adapters 132, 134, 136, 138 to facilitate connection between the coaxial cables of the coaxial cable network 112 and the user devices 102, 104, 106 and network interface 108, respectively. Each MoCA adapter 132, 134, 136, 138 operates to convert Ethernet-based signaling received to OFDM-based signaling appropriate for transmission over the coaxial cable network 112, and to convert OFDM-based signaling received from the coaxial cable network 112 to Ethernet-based signaling for output to the corresponding networked device. Although illustrated as separate from the user devices 102, 104, 106, and network interface 108, in other embodiments one or more of the MoCA adapters may be implemented as an integral part of the corresponding networked device.

As illustrated by the depicted example implementation of the MoCA adapter 136, each of the MoCA adapters 132, 134, 136 operates as an OFDMA transceiver device that includes a signaling interface 140 (e.g., a coaxial cable interface in this example), an OFDM receiver 142, an OFDM transmitter 144, and an OFDM controller 146. The OFDM receiver 142 operates to transform OFDM-based signaling received from the coaxial cable network 112 via the signaling interface 140 to a digital data stream (denoted "DATA IN" in FIG. 1) for transmission to the corresponding networked device via, for example, an Ethernet connection. Conversely, the OFDM transmitter 144 operates to transform a digital data stream (denoted "DATA OUT" in FIG. 1) received from a networked device via the Ethernet connection to corresponding OFDM signaling for transmission over the coaxial cable network 112 via the signaling interface 140. As described in greater detail below, the OFDM controller 146 receives configuration information identifying various operational parameters for the OFDM receiver 142 and the OFDM transmitter 144, including subchannel allocations and subchannel bit loading information. The OFDM controller 146 operates to configure such parameters at the OFDM transmitter 144 for implementation via control signaling (denoted "CONTROL" in FIG. 1).

The MoCA standards (e.g., MoCA 1.1 and MoCA 2.0) provide for the use of adaptive constellation multi-tone (ACMT) modulation, which is a form of OFDM signaling that allocates subchannels of an OFDM channel among multiple upstream transmit nodes, and well as adaptive bit loading for the allocated subchannels to enable multiple transmit nodes to concurrently transmit for each OFDM frame. Accordingly, in a downstream transmission scheme, the MoCA adapters 132, 134, 136 operate as a plurality of transmit nodes and the MoCA adapter 138 operates as a single receive node. Thus, in one embodiment, the MoCA adapter 138 operates as a control node for the MoCA adapters 132, 134, 136 for such downstream transmissions.

As control node, the MoCA adapter 138 coordinates the upstream MoCA adapters' participation in the transmission of OFDM frames as OFDMA frames to the MoCA adapter 138 by controlling the allocation of subchannels among the transmit nodes represented by the MoCA adapters 132, 134, 136, as well as controlling the bit loading and other parameters to be implemented by the MoCA adapters 132, 134, 136 with respect to their allocated subchannels. Thus, in addition to implementing a signaling interface 150 (corresponding to the signaling interface 140), an OFDM receiver 152 (corresponding to the OFDM receiver 142), and an OFDM transmitter 154 (corresponding to the OFDM transmitter 154), the MoCA adapter 138 further implements a channel allocation module 156 that operates to control the allocation and bit loading of subchannels among the upstream transmit nodes, as well as the selection of subchannels for use as pilots for channel estimation purposes. The channel allocation module 156 may be implemented, for example, as part of the OFDM controller 146 or in conjunction with the OFDM controller 146, such that some or all of the MoCA adapters 132, 134, 136, 138 may operate both as transmit nodes and receive nodes for different transmissions in accordance with the techniques described herein.

Although illustrated in a MoCA implementation, the configurations illustrated with respect to MoCA adapters 136 and 138 may instead be implemented for other wired or wireless implementations using OFDMA signaling schemes. To illustrate, rather than being implemented as a coaxial cable interfaces, the signaling interfaces 140 and 150 instead could be implemented as radio frequency (RF) antenna interfaces or other wireless network interface for use in, for example, a WiFi or WiMAX system.

The OFDM controller 146 and the channel allocation module 156 each may be implemented entirely in hard-coded logic (that is, hardware), as a combination of software stored in a non-transitory computer readable storage medium (e.g., system memory, flash memory, a hard disc drive, an optical disc, etc.) and one or more processors to access and execute the software, or as combination of hard-coded logic and software-executed functionality. To illustrate, in one embodiment, the MoCA adapters 132, 134, 136, 138 each implements a system on a chip (SOC), application specific integrated circuit (ASIC), field programmable gate array (FPGA) or other integrated circuit (IC) package whereby portions of the OFDM controller 146 or channel allocation module 156 are implemented as hardware logic, and other portions are implemented via firmware stored at the IC package and executed by one or more processors of the IC package. Such processors can include a central processing unit (CPU), a microcontroller, a digital signal processor, a field programmable gate array, programmable logic device, state machine, logic circuitry, analog circuitry, digital circuitry, or any device that manipulates signals (analog and/or digital) based on operational instructions that are stored in the memory or other non-transitory computer readable storage medium. The non-transitory computer readable storage medium storing such software can include, for example, a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In at least one embodiment, the channel allocation module 156 utilizes a bucket-based subchannel allocation scheme whereby the plurality of subchannels of the OFDM channel are distributed among a plurality of buckets in an order based on signal-to-noise ratio (SNR) vectors determined for each transmit node based on soundings from the transmit node to the MoCA adapter 138 via the corresponding transmit path between the transmit node and the MoCA adapter 138. Each SNR vector includes an SNR value for each subchannel as determined based on the soundings from the transmit node. That is, the SNR vector represents the particular SNRs for the transmit node over the plurality of subchannels.

With the SNR vectors so identified, the channel allocation module 156 may start allocating subchannels among the buckets, and during this allocation determine an initial total bit loading of each bucket from the SNRs of the subchannels assigned to the bucket. The channel allocation module 156 may utilize an equalization process after the allocation has completed so that each bucket has the same final total bit loading. In some embodiments, this is accomplished by reducing the bit loading of those buckets having an initial total bit loading greater than the lowest initial total bit loading, starting with the subchannels with the highest bit loading in each of such channels. The buckets are assigned among the transmit nodes based on their data rate requirements, with the number of buckets assigned being proportional to the date rate requirement. Each transmit node is then allocated those subchannels in the buckets assigned to the transmit node. The channel allocation module 156 then uses the OFDM transmitter 154 to transmit these subchannel allocations and the subchannel bit loading parameters determined from the equalization process as control information to the MoCA adapters 132, 134, 136. The OFDM controller 146 of each MoCA adapter uses this information to configure its corresponding OFDM transmitter 144 to use the subchannels allocated to the MoCA adapter with symbol encoding consistent with the indicated subchannel bit loading.

In some embodiments, the OFDM receiver 152 utilizes one frequency-domain-based feedback loop for channel estimation per transmit node in order to compensate for variation in carrier frequency offsets in OFDMA transmissions. Each feedback loop maintains a running offset estimate for the corresponding transmit node and corrects for errors in transmitted OFDM symbols from the transmit node using the transmit node's running offset estimate. Thus, rather than use the entire carrier to calculate a single running offset estimate and apply it equally to every transmit node, the OFDM receiver 152 instead can obtain more reliable transmission reception by maintaining a separate running offset estimate for each transmit node. However, in a conventional pilot selection approach, the pilots are selected among the subchannels so as to be evenly distributed across the channel. Depending on how the subchannels are allocated among the transmit nodes using the bucket-based approach described herein, it is possible that few or no pilots could be assigned to a transmit node under the conventional even-distribution pilot selection approach, and thus the transmit node would not have a sufficient number of pilots to permit accurate characterization for the transmit-node-based feedback loop.

Accordingly, in at least one embodiment, the channel allocation module 156 can use the bucket-based distribution of the subchannels to facilitate selection of subchannels for use as pilots on a bucket-by-bucket basis, thereby more fully ensuring that pilots are distributed among the transmit nodes, rather than distributed evenly across the channel. By biasing pilot selection in this manner, it is more likely that a given transmit node will have a sufficient number and quality of pilots for use in obtaining channel estimates on a transmit node-by-transmit node basis.

Figure 2:
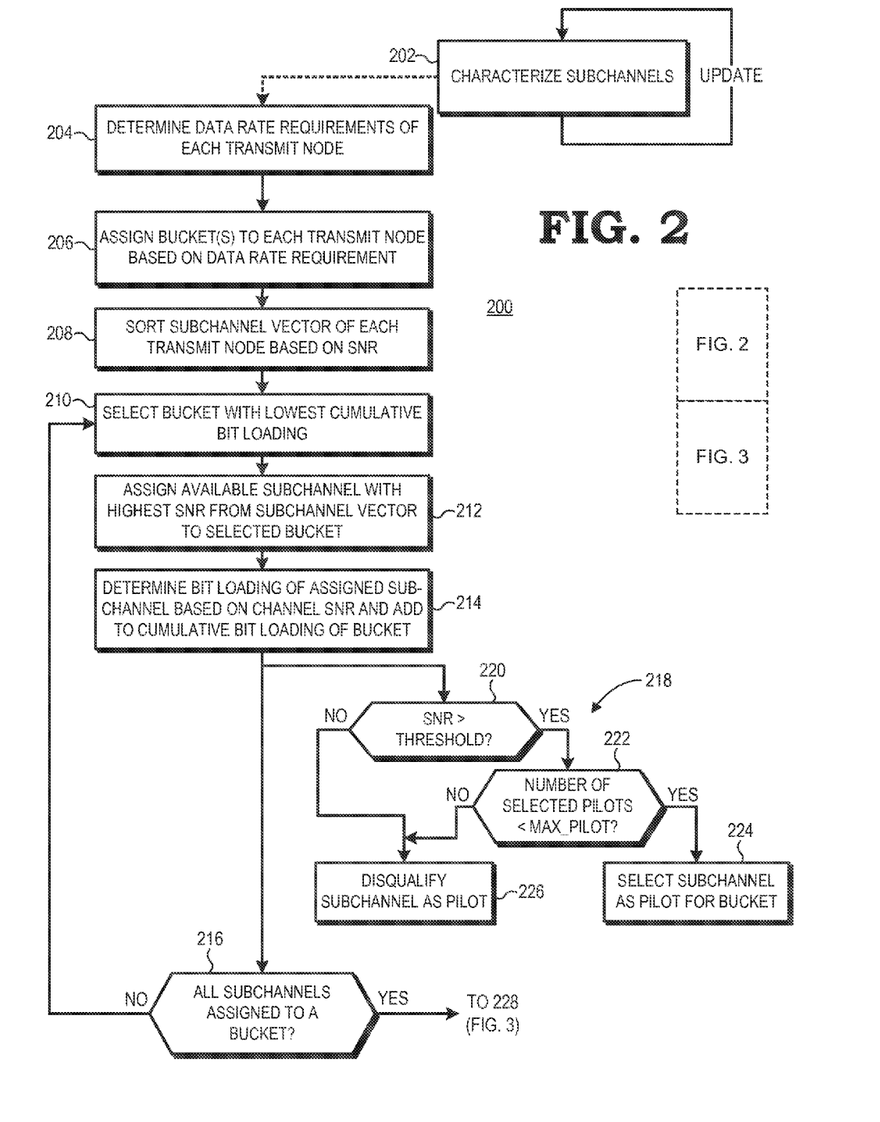
FIG. 2 is a flow diagram illustrating a method for bucket-based allocation of subchannels among multiple transmit nodes and bucket-based selection of subchannels for use as pilots in an OFDMA-based system in accordance with at least one embodiment of the present disclosure.
Figure 3:
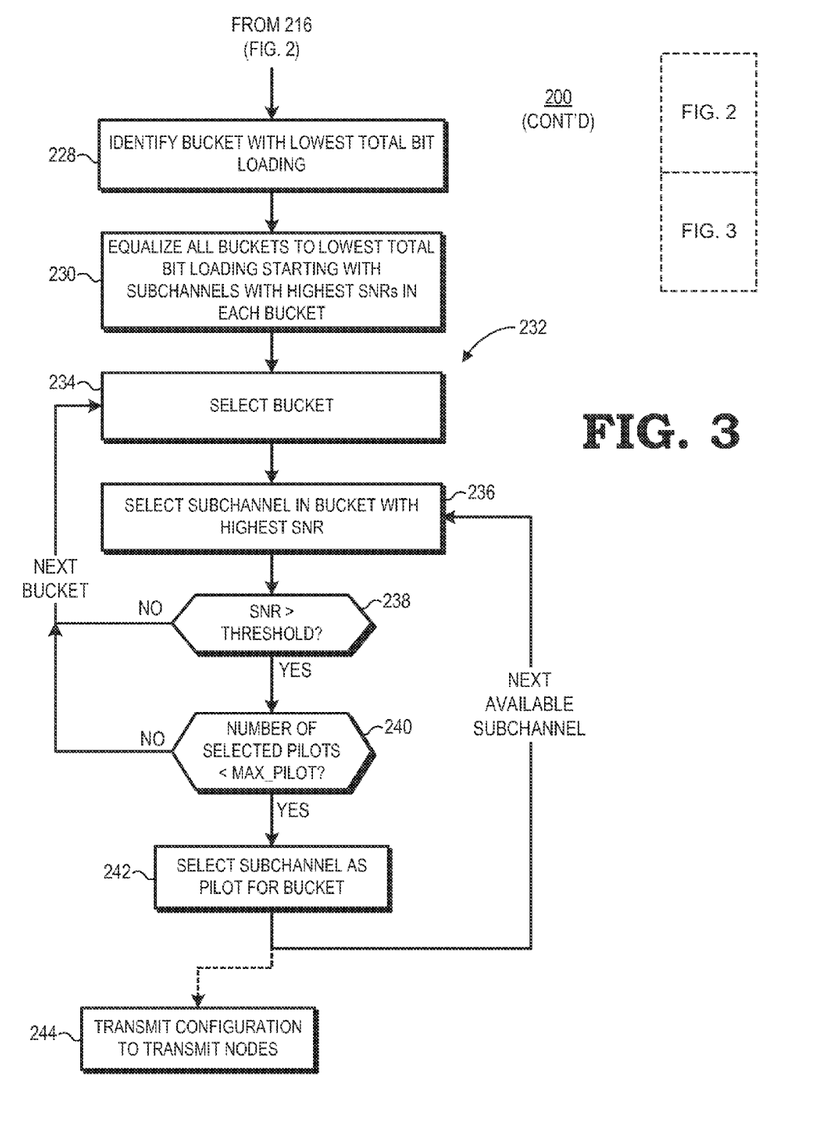
FIG. 3 is a flow diagram continuing the illustration of the method of FIG. 2 in accordance with at least one embodiment of the present disclosure.

FIGS. 2 and 3 together illustrate a method 200 for bucket-based subchannel allocation and pilot selection in accordance with at least one embodiment of the present disclosure. For ease of description, the method 200 is described in the example context of the MoCA-based networked system 100 of FIG. 1. However, the method 200 may be implemented in other wired or wireless OFDMA systems using the guidelines provided herein.

The method 200 initiates at block 202, whereupon the OFDM receiver 152 characterizes the subchannels of the OFDMA channel established between user devices 102, 104, 106 as transmit nodes and the network interface 108 as a receive node to determine various parameters for the subchannel. Any of a variety of channel characterization processed may be implemented. Typically, such processes involve the transmission of training preambles between the transmit nodes (i.e., the user devices 102, 104, 106) and the receive node (i.e., the network interface 108) and the analysis of the received results at the receive node to determine the channel parameters. In at least one embodiment, one of the channel estimation processes includes a signal-to-noise (SNR) estimation process to determine a SNR vector for each transmit node. Each SNR vector represents a set of SNRs for the plurality of subchannels for a particular transmit node. Thus, if there are N transmit nodes and M subchannels, the OFDM receiver 152 determines N SNR vectors, each SNR vector having M SNR values, with each of the M SNR values corresponding to the SNR value measured in a training transmission by the transmit node in the corresponding subchannel. To illustrate, assuming a simplified example with 256 subchannels, the transmit node 102 would have a SNR vector with 256 SNR values, each SNR value representing the SNR measured in the corresponding one of the 256 subchannels from a sounding transmitted from the transmit node 102, and the transmit node 104 would have a separate SNR vector with 256 SNR values, each SNR value of this SNR vector representing the SNR measured in the corresponding subchannel from a sounding transmitted from the transmit 104, and so forth. Each SNR vector may be represented by any of a variety of data structures, such as a list, table, array, set, and the like. Any of a variety of SNR estimation processes may be utilized to determine the SNR values, and such process may be repeated on a periodic basis or other basis so as to update the SNR parameters and other estimated parameters as needed.

Concurrent with the subchannel characterization process of block 202, at block 204 the channel allocation module 156 determines the data rate requirements of each transmit node. In some embodiments, this is determined with the assistance of a higher-level layer, such as a media access control (MAC) layer implemented in the networked system 100. To illustrate, referring back to FIG. 1, each user device 102, 104, and 106 may support a corresponding multimedia application (denoted stream sources A, B, and C, respectively) sourcing a multimedia data stream to be transmitted to the network interface 108 for further transmission to the network 110. The MAC layer may determine the data rate requirements for transmitting the multimedia streams from each multimedia application, or from some parameter associated with the multimedia streams themselves (e.g., a maximum bit rate parameter).

At block 206, the channel allocation module 156 instantiates a plurality of "buckets" and assigns the buckets among each transmit node according to the transmit node's data rate requirement. As described below, each "bucket" serves as a container to store an identifier or vector for each subchannel assigned to that bucket, and thus the buckets may be implemented as any of a variety of suitable data structures, such as a linked list, table, array, and the like. In one embodiment, the channel allocation module 156 assigns buckets based on the least common multiple of rational numbers (LCM) of the data rates of the transmits nodes so as to guarantee an integer number of buckets assigned to each transmit node. To illustrate, assume an example whereby stream source A has a data rate requirement of 2.1 megabits/second (Mb/s), stream source B has a data rate requirement of 4.0 Mb/s, and data source C has a data rate requirement of 5.9 Mb/s. In this example, the LCM is 4956, and thus the number of buckets assigned to stream source A is 2360 (4956/2.1), the number of buckets assigned to stream source B is 1239 (4956/4.0), and the number of buckets assigned to stream source C is 840 (4956/5.9). However, in many instances, such as the one outlined above, the number of buckets assigned under this approach may exceed the number of subchannels to be allocated. In such instances, any of a variety of approximations of the LCM algorithm may be used instead, such as by setting each transmit node's bucket assignment equal to an integer-rounded ratio of that transmit node's data requirement rate to the lowest data rate requirement. Accordingly, using this integer-rounded ratio approach for the example outlined above, stream source A has the lowest data rate requirement of 2.1 Mb/s, and thus stream source A is assigned a single bucket. Stream source B has a data rate requirement that is 1.9× the lowest data rate requirement, and thus stream source B is assigned two data buckets. Stream source C has a data rate requirement that is 2.8× the lowest data rate requirement, and thus stream source C is assigned three buckets. As such, a total of six (6) buckets are instantiated for the three stream sources A, B, and C. For ease of illustration, this six bucket assignment scenario is utilized below.

At block 208, the channel allocation module 156 uses the subchannel SNR information obtained at block 202 to sort or otherwise organize each SNR vector by SNR value from subchannel with the highest SNR in the SNR vector to subchannel with the lowest SNR in the SNR vector. To illustrate, the channel allocation module 156 can create a vector, linked-list, stack, or other data structure that lists the subchannels from highest SNR to lowest SNR within a particular SNR vector. Because the SNR readings on a per-subchannel basis are likely to differ among the transmit nodes, the ordering of subchannels within the sorted SNR vectors likewise will differ.

With the SNR vectors so sorted, the channel allocation module 156 initiates a process of distributing the plurality of subchannels among the buckets instantiated at block 206. MoCA and many other OFDM-based systems utilize bit loading schemes whereby the number of bits assigned to a symbol to be transmitted in a subchannel is based on the SNR of the subchannel. That is, the bit loading assigned to a subchannel is a function of the SNR of that subchannel. Any of a variety of conventional bit loading techniques thus may be used to determine the bit loading that may be assigned to a given subchannel based on the subchannels SNR. The bit loading assigned to a subchannel thus influences the particular symbol encoding scheme employed by the transmit node for that subchannel. To illustrate, if a subchannel is assigned a bit loading of 1 bit/symbol, the transmit node allocated that subchannel may use, for example, binary phase shift keying (BPSK) to encode the symbol, whereas the transmit node may use, for example, 64-QAM (quadrature amplitude modulation) to encode a symbol for a subchannel assigned a bit loading of 6 bits/symbol. Accordingly, in at least one embodiment, the subchannel distribution process uses an iterative loop based on the cumulative bit loadings for each bucket at each iteration of the loop.

At the start of each iteration of this loop, the channel allocation module 156 selects the bucket with the lowest cumulative bit loading at block 210. For the first iteration, the cumulative bit loadings for every bucket is zero, and thus the channel allocation module 156 may select the buckets in a specified order until each has a non-zero cumulative bit loading. With the bucket with the lowest cumulative bit loading so selected, at block 212 the channel allocation module 156 selects from the SNR vector of the transmit node associated with the bucket the subchannel with the highest SNR from those subchannels still available for distribution and distributes or otherwise assigns the selected subchannel to the selected bucket with the lowest cumulative bit loading. As noted above with respect to block 208, the channel allocation module 156 may maintain sorted SNR vectors, and thus the subchannel with the highest SNR for the associated transmit node thus may be selected by selecting the available subchannel at the top of the sorted SNR vector for the transmit node. Once selected and distributed, the subchannel is removed from the list or otherwise marked as no longer available for distribution. To this end, the channel allocation module 156 may maintain a subchannel availability vector to identify those subchannels available or unavailable for allocation as the allocation process progresses.

At block 214 the channel allocation module 156 determines the bit loading for the selected subchannel based on its SNR and then increases the cumulative bit loading of the selected bucket by this bit loading so as to reflect the addition of the selected subchannel to the selected bucket. To illustrate, if the cumulative bit loading of the bucket is 14 bits/symbol and the selected subchannel has a SNR of 40 decibels (dB) for the corresponding transmit node, which corresponds to a bit loading of, say, 6 bits/symbol in this example, the cumulative bit loading of the bucket is increased to 20 bits/symbol following the addition of the subchannel to the bucket.

At block 216, the channel allocation module 156 determines whether it has distributed all of the subchannels to the plurality of buckets. If not, the channel allocation module 156 returns to block 210 and repeats another iteration of the loop represented by blocks 210, 212, 214, and 216. Thus, under this iterative approach, the channel allocation module 156 distributes the subchannels among the buckets on the basis of the SNRs of the subchannels for the transmit nodes and the cumulative bit loading of each bucket at the start of each iteration in a manner that attempts to establish a substantially equal initial total bit loading for each bucket after the distribution phase of method claim 200 is completed.

In at least one embodiment, an initial pilot selection subprocess 218 is performed as part of the subchannel bucket distribution process. In this approach, subchannels are selected for use as pilots on a per-bucket basis, with a maximum number of subchannels per bucket set based on a programmable value, based on a function of the current channel state (and updated dynamically as circumstances warrant), and the like. Further, to ensure sufficient characterization quality, only those channels with sufficient SNR margin to ensure accurate channel characterization (as may be programmed on a per-bucket or per-transmit-node basis) may be selected for use as pilots. That is, there may be a different SNR margin for each transmit node as the SNR conditions may vary widely between the transmit nodes. Thus, these margins may be programmable based on channel conditions, which may be determined from the signaling used to determine SNR per subchannel or based on receiver impairment estimates, such as carrier frequency offset and the like.

After the selection and distribution of a subchannel to a corresponding bucket (blocks 210, 212, and 214), at block 220 the channel allocation module 156 evaluates the suitability of the subchannel for use as a pilot by comparing the SNR of the subchannel to a minimum SNR threshold determined or estimated as the SNR margin suitable for a subchannel to be used as a pilot for the corresponding transmit node. If the SNR of the subchannel is greater than this threshold, at block 222 the channel allocation module 156 determines whether the maximum number of pilots for the bucket (MAX_PILOT) have already been selected. If not, at block 224 the channel allocation module 156 initially selects the subchannel for use as a pilot in the bucket. Otherwise, if the SNR of the subchannel is less than the threshold or if the maximum number of pilots has already been selected for the bucket, at block 226 the channel allocation module 156 disqualifies the subchannel for use as a pilot or otherwise avoids selecting the subchannel for use as a pilot.

Returning to block 216, when all of the subchannels have been assigned to a corresponding bucket, the channel allocation module 156 enters a final allocation phase whereby the buckets are equalized and the selection of subchannels may be refined. This final allocation phase is represented by the continuation of method 200 in FIG. 3, starting with block 228. At block 228, the channel allocation module 156 designates the final cumulative bit loadings for the buckets as the initial total bit loadings for the buckets following the distribution phases, and from these initial total bit loadings identifies the bucket having the lowest initial total bit loading. To facilitate more reliable communications, at block 230 the channel allocation module 156 equalizes the bit loading across all of the buckets by configuring each bucket to have a total bit loading equal to the lowest total bit loading determined at block 228. To illustrate, assume there are three buckets, with initial total bit loadings of 212, 211, and 208 bits/symbol, respectively. In this case, the lowest total bit loading is 208 bits/symbol, and thus the bucket with an initial total bit loading of 212 bits/symbol is reduced by 4 bits/symbol to have a final total bit loading of 208 bits/symbol, and the bucket with an initial total bit loading of 210 bits/symbol is reduced by 2 bits/symbol to likewise have a final total bit loading of 208 bits/symbol.

In some embodiments, the reduction in total bit loading of a bucket to match the lowest total bit loading is achieved by reducing the bit loading of one or more subchannels in the bucket, starting with the subchannels with the highest SNRs. In some implementations, this reduction can be evenly spread over a number of subchannels. To illustrate, if a 6 bit/symbol reduction is needed, the bit loadings of the three subchannels with the highest SNRs in the bucket each can be reduced by 2 bits/symbol. In other implementations, the reduction can be applied to a single subchannel, or to multiple subchannels proportional to their original bit loadings. To illustrate, if a 4 bit/symbol reduction is needed, the entire 4 bit/symbol reduction can be applied to the subchannel with the highest SNR in the bucket, or if a 6 bit/symbol reduction is needed, a 4 bit/symbol reduction can be applied to the subchannel with the highest SNR in the bucket, and a 2 bit/symbol reduction can be applied to the subchannel with the second highest SNR in the bucket.

The reduction of the bit loading for a subchannel within a bucket due to this equalization process results in a corresponding reduction in the SNR associated with the subchannel; that is, the SNR attributed to the subchannel also can be viewed in this case as a function of the final bit loading attributed to the subchannel as a result of this equalization process. As noted above, in some embodiments the selection of a subchannel for use as a pilot is predicated on the subchannel having sufficient SNR margin. However, as the pilots are selected from the subchannels with the highest SNRs in the bucket, and as the bit loading equalization is achieved by reducing the bit loading of the subchannels with the highest SNRs in the bucket, the equalization process may have the effect of reducing the SNR of a subchannel initially selected for use as a pilot to the point that the subchannel will no longer qualify for use as a pilot.

Accordingly, in at least one embodiment, the method 200 implemented by the channel allocation module 156 includes a final pilot selection subprocess 232 to finalize the per-bucket pilot selection. Thus, after the equalization process of blocks 228 and 230, at block 234 the channel allocation module 156 selects a bucket for final pilot selection. At block 236, the channel allocation module 156 selects the subchannel with the highest SNR in the selected bucket. Note that this SNR may have been reduced from its original value due to the equalization process, as noted above. At block 238, the channel allocation module 156 compares this SNR with the minimum SNR threshold described above with respect to block 220. If the SNR exceeds the threshold, then at block 240 the channel allocation module 156 determines whether the maximum number of pilots (MAX_PILOT) have already been selected for the bucket, as similarly described above with reference to block 222. If not, then at block 242 the channel allocation module 156 selects the subchannel for use as a pilot for the bucket. The process of blocks 236, 238, and 240 repeats for the subchannel with the next highest SNR in the bucket until either the maximum number of pilots have been selected for the bucket, or the SNR of the selected subchannel is no longer above the minimum SNR threshold, at which point the process returns to block 234, whereupon another bucket is selected and the final pilot selection process is repeated for this bucket.

When all of the buckets have been processed in this manner, at block 244 the channel allocation module 156 initializes the transmit nodes to implement the subchannel allocation scheme determined in the steps described above. To this end, the channel allocation module 156 generates configuration information identifying, for each transmit node, the subset of subchannels allocated to the transmit node based on the one or more buckets assigned to the transmit mode, the bit loading to be implemented for each subchannel so allocated, and those allocated subchannels to be used by the transmit node as pilots. This configuration information is transmitted by OFDM receiver 152 as OFDM signaling to each of the MoCA adapters 132, 134, 136, whereupon the configuration information is extracted by the OFDM receiver 142 at each MoCA adapter and provided to the OFDM controller 146. In response to this configuration information, the OFDM controller 146 uses the control signaling to configure the OFDM transmitter 144 according to the subset of subchannels allocated to the MoCA adapter, along with the bit loading and pilot usage for the subchannels as specified by the control information. The OFDM transmitter 144 then may conduct OFDM signaling accordingly until a revised channel allocation scheme is devised by the channel allocation module 156 in response to, for example, changing channel conditions, changing data rate requirements of the transmit nodes, and the like.

Figure 4:
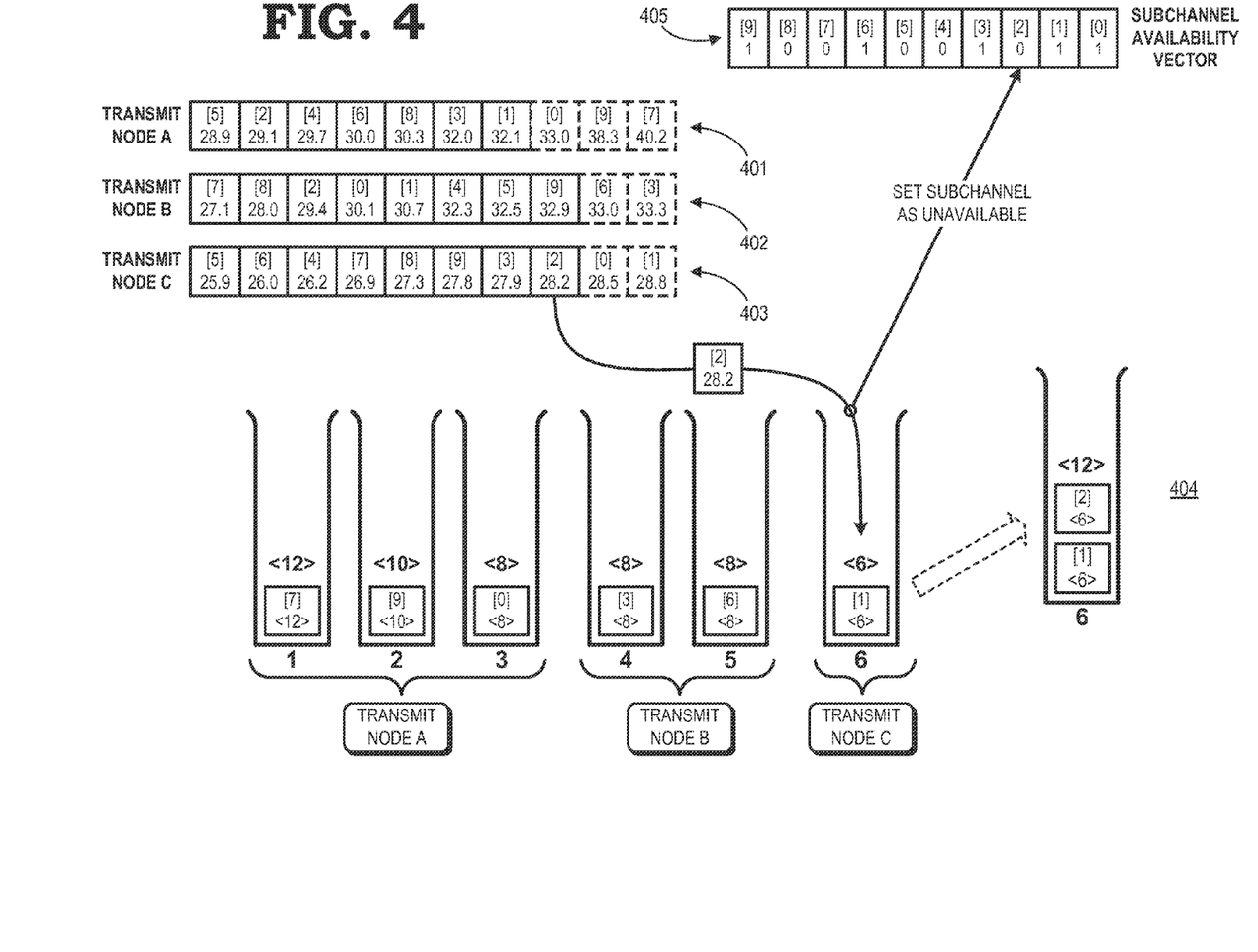
FIG. 4 is a diagram illustrating example an example initial phase of a bucket-based allocation of subchannels among multiple transmit nodes in accordance with at least one embodiment of the present disclosure.
Figure 5:
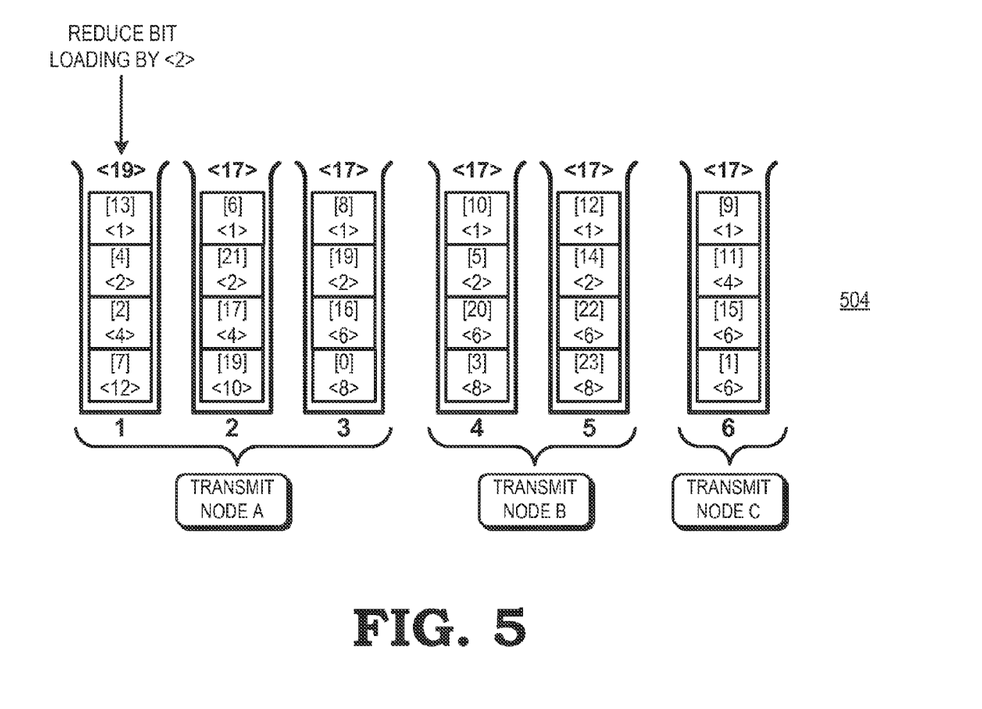
FIG. 5 is a diagram illustrating an example final phase of the bucket-based allocation of subchannels among the multiple transmit nodes of FIG. 4 in accordance with at least one embodiment of the present disclosure.

FIGS. 4 and 5 illustrate simplified example implementations of the bucket-based channel allocation and equalization process of the method 200 in accordance with at least one embodiment. For this example of FIG. 4, assume that an OFDM channel has ten (10) subchannels, numbered [0]-[9], to be utilized by three transmit nodes, denoted transmit nodes A, B, and C. Further, in this example, the transmit node A has a data rate requirement three times that of the transmit node C, and the transmit node B has a data rate requirement two times that of the transmit node C. Thus, transmit node A is assigned three buckets, denoted buckets 1, 2, and 3, the transmit node B is assigned two buckets, denoted buckets 4 and 5, and the transmit node C is assigned one bucket, denoted bucket 6. Through a channel characterization process, SNR values for each subchannel and for each transmit node are determined, resulting in SNR vectors 401, 402, and 403 for transmit nodes A, B, and C, respectively. Each box in the corresponding SNR vector represents a corresponding subchannel and containing a top number in brackets to represent the corresponding subchannel number (e.g., "[7]" representing subchannel 7), and a bottom number to represent the SNR of the subchannel in dB (e.g., "40.2" representing an SNR of 40.2 dB for subchannel 7) as measured for the corresponding transmit node. FIG. 4 illustrates the SNR vectors 401, 402, and 403 after the SNR vectors have been sorted by subchannel with the highest SNR in each vector to subchannel with the lowest SNR in each vector.

The distribution process starts with empty buckets 1-6, and thus each bucket has an initial cumulative bit loading of zero. Accordingly, the six subchannels with the highest SNRs, subchannels [7], [9], [0], [3], [6], and [1], are distributed to buckets 1, 2, 3, 4, 5, and 6, respectively. In FIGS. 4 and 5, when a subchannel is distributed to a bucket, a box representing the distributed subchannel is placed in the corresponding bucket, whereby the box contains a top number in brackets to represent the corresponding subchannel number and a bottom number in brackets "<X>" to represent the initial bit loading assigned to the subchannel based on its corresponding SNR (e.g., "<10>" representing a bit loading of 10 bits/symbol for subchannel 7 due to an SNR of 40.2 dB for subchannel 7 in this example). FIG. 4 further illustrates a subchannel availability vector 405 used by the channel allocation module 156 to identify which subchannels have already been allocated at the current point in the allocation process, with a value of "0" indicating the subchannel is available for allocation, and a value of "1" indicating that the subchannel has already been allocated and thus not available for allocation. As depicted, because subchannels [0], [1], [3], [6], [7], and [9] have been allocated at this point, the subchannel availability vector 405 uses the value "1" for each of these subchannels to indicate that they have already been allocated.

As illustrated by the depicted initial stage 404, the cumulative bit loading of each bucket is calculated in response to the distribution of each of the initial wave of subchannels among the buckets. The cumulative bit loadings of the buckets are illustrated as numbers in brackets and bold font, such that the characters "<10>" illustrated in bucket 1 indicates that bucket 1 has a cumulative bit loading of 10 bits/symbol at this point. At the point in the distribution process represented by initial stage 404, bucket 6 has the lowest cumulative bit loading at 6 bits/symbol, and thus bucket 6 is chosen to for selection and allocation of the next available subchannel. Accordingly, the channel allocation module 156 analyzes the sorted SNR vector 403 associated with the transmit node C to identify the available subchannel with the highest SNR from sorted SNR vector 403. In this example, while subchannels [0] and [1] have higher SNRs than subchannel [2] in the SNR vector 403, subchannels [0] and [1] have already been allocated, and thus subchannel [2] is selected for allocation to bucket 6 as it is the subchannel with the highest SNR in the sorted SNR vector 403 that is available for allocation. Subchannel [2] has an SNR of 28.2 in the SNR vector 403, which corresponds to a bit loading of 6 bits/symbol, and thus the cumulative bit loading of bucket 6 increases to 12 bits/symbol after the addition of subchannel [2] to bucket 6.

Turning to FIG. 5, an example of a final stage 504 in the iterative allocation process is illustrated. In the example of FIG. 5, assume that the OFDM channel has twenty-four (24) subchannels, numbered [0]-[23], to be utilized by three transmit nodes, denoted transmit nodes A, B, and C. Final stage 504 illustrates the buckets 1-6 after distribution of all twenty-four subchannels has completed. In this example, bucket 1 has an initial total bit loading of 19 bits/symbol and buckets 2-6 each has an initial total bit loading of 17 bits/symbol. Accordingly, the buckets 1-6 are equalized by reducing the total bit loading of bucket 1 by 2 bits/symbol to 17 bits/symbol, which matches the total bit loading of 17 bits/symbol. This bit loading reduction can be accomplished by, for example, reducing the bit loading assigned to subchannel 7 from 12 bits/symbol to 10 bits/symbol, with the corresponding reduction in SNR attributed to subchannel 7 to reflect the reduced final bit loading accorded to subchannel 7.

Figure 6:
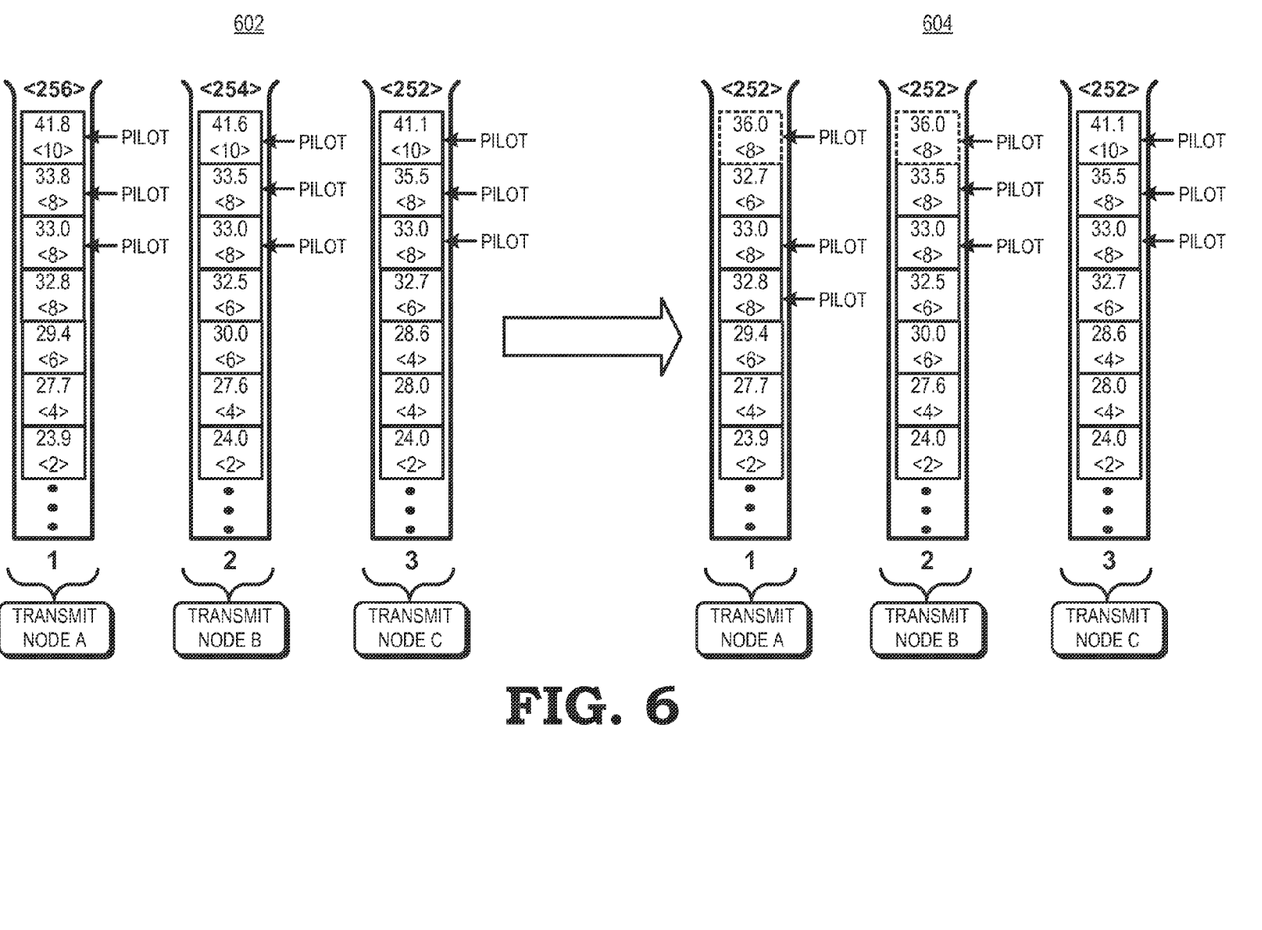
FIG. 6 is a diagram illustrating an example of bucket-based pilot selection for multiple transmit nodes in accordance with at least one embodiment of the present disclosure.

FIG. 6 illustrates a simplified example implementation of the bucket-based pilot selection process of the method 200 in accordance with at least one embodiment. For this example, assume that an OFDM channel has 224 subchannels to be utilized by three transmit nodes, denoted transmit nodes A, B, and C, with A. Further, in this example, the transmit nodes A, B, and C have roughly equal data rate requirements, and thus each transmit node is assigned a single bucket, with transmit node A being assigned bucket 1, transmit node B being assigned bucket 2, and transmit node C being assigned bucket 3. Further, the maximum number of pilots for each bucket (MAX_PILOT) has been set to 3 for this example. As with FIGS. 4 and 5, each box in the buckets 1-3 represents a corresponding subchannel, with the top number in the box representing the SNR of the subchannel and the bottom number in brackets "<X>" representing the bit loading assigned to the subchannel in view of its SNR. The number in bold font and in brackets at the top of each bucket represents the total bit loading for the bucket.

Stage 602 of FIG. 6 illustrates the state of buckets 1-3 after distribution of the subchannels among the buckets 1-3 has completed, but before equalization and final pilot selection. In the depicted example, bucket 1 has an initial total bit loading of 256 bits/symbol, bucket 2 has an initial total bit loading of 254 bits/symbol, and bucket 3 has an initial total bit loading of 252 bits/symbol. Further, in this example, the minimum SNR threshold for pilot selection is 33.0 dB, and thus the three subchannels having the highest SNRs in each bucket are able to be tentatively selected for use as pilots such that each bucket has the maximum of three pilots.

Stage 604 illustrates the state of buckets 1-3 after equalization whereby the total bit loading of bucket 1 is reduced by 4 bits/symbol and the total bit loading of bucket 2 is reduced by 2 bits/symbol so as to match the lowest total bit loading of 252 found in bucket 3. In the depicted example, the bit loading reduction for bucket 1 is achieved by reducing the bit loading assigned to the top subchannel from 10 bits/symbol to 8 bits/symbol (with a corresponding reduction in SNR from 41.8 dB to 36.0 dB) and reducing the bit loading assigned to the second subchannel from 8 bits/symbol to 6 bits/symbol (with a corresponding reduction in SNR from 33.78 dB to 32.7 dB). Similarly, the bit loading reduction for bucket 2 is achieved by reducing the bit loading assigned to the top subchannel in bucket 2 from 10 bits/symbol to 8 bits/symbol, with the corresponding reduction in SNR from 41.6 dB to 36.0 dB.

The reduction in SNR attributed to the highest-SNR subchannels in buckets 1 and 2 in order to effect the equalization has rendered the second subchannel in bucket 1 ineligible for use as a pilot as its revised SNR, at 32.7, is below the minimum SNR threshold of 33.0 set for pilot selection in this example (note that although a single threshold is used in this example, each transmit node, or even each bucket, may have its own threshold set based on SNRs of the corresponding SNR vector or based on other channel conditions). Accordingly, as illustrated by stage 604, the SNRs of the remaining subchannels in bucket 1 are analyzed according to the process of method 200 to make the final pilot selections, which in this example results in the first, third, and fourth subchannels in bucket 1 as being selected for use as pilots as these subchannels have the highest SNRs in bucket 1, post-equalization, that are also above the minimum SNR threshold.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   determining, at an orthogonal frequency division multiplexing (OFDM) transceiver device, a corresponding signal-to-noise ratio (SNR) for each of a plurality of subchannels of an orthogonal frequency division multiplexing OFDM channel for each of a plurality of transmit nodes;
   allocating, at the OFDM transceiver device, the plurality of subchannels of the OFDM channel among the plurality of transmit nodes by:
     assigning to each transmit node a corresponding subset of buckets of a plurality of buckets, the number of buckets in the subset based on a data rate requirement of the transmit node;
     distributing the plurality of subchannels among the plurality of buckets based on the SNRs of the plurality of subchannels; and
     for each transmit node, allocating to the transmit node the subchannels distributed to the subset of buckets assigned to the transmit node; and
   configuring each transmit node to utilize the subchannels allocated to the transmit node;
   wherein assigning to each transmit node a corresponding subset of buckets of the plurality of buckets comprises:
     determining a least common multiple for the data rate requirements of the plurality of transmit nodes; and
     for each transmit node, assigning a number of buckets based on the data rate requirement of the transmit node and the least common multiple.

2. A method comprising:
   determining, at an orthogonal frequency division multiplexing (OFDM) transceiver device, a corresponding signal-to-noise ratio (SNR) for each of a plurality of subchannels of an orthogonal frequency division multiplexing OFDM channel for each of a plurality of transmit nodes;

allocating, at the OFDM transceiver device, the plurality of
subchannels of the OFDM channel among the plurality
of transmit nodes by:
assigning to each transmit node a corresponding subset
of buckets of a plurality of buckets, the number of
buckets in the subset based on a data rate requirement
of the transmit node,
distributing the plurality of subchannels among the plurality of buckets based on the SNRs of the plurality of
subchannels, and
for each transmit node, allocating to the transmit node
the subchannels distributed to the subset of buckets
assigned to the transmit node; and
configuring each transmit node to utilize the subchannels
allocated to the transmit node; and
wherein distributing the plurality of subchannels among
the plurality of buckets comprises accumulating a total
bit loading of each bucket during distribution of the
plurality of subchannels by:
for a bucket with the lowest total bit loading:
selecting, for distribution to the bucket, an available
subchannel having the highest SNR for the transmit
node associated with the bucket;
determining a bit loading of the selected subchannel;
and
increasing the total bit loading of the bucket by the bit
loading of the selected subchannel; and
repeating the selecting, determining, and increasing for
the bucket with the lowest total bit loading at each
repetition until every subchannel has been distributed.

3. The method of claim 2, wherein configuring each transmit node to utilize the subchannels distributed to the transmit node comprises configuring each transmit node to implement the bit loading determined for each subchannel.

4. The method of claim 2, further comprising:
after distributing every subchannel to the plurality of buckets:
determining a lowest total bit loading of the plurality of buckets; and
equalizing the total bit loading of the plurality of buckets to the lowest total bit loading by reducing a bit loading of each of one or more subchannels distributed to those buckets having a total bit loading greater than the lowest total bit loading.

5. The method of claim 4, wherein configuring each transmit node to utilize the subchannels distributed to the transmit node comprises configuring each transmit node to utilize the bit loading determined for each subchannel after equalizing the total bit loading of the plurality of buckets.

6. The method of claim 4, wherein:
reducing the bit loading of each of the one or more subchannels for equalizing the total bit loading of the plurality of buckets reduces the SNRs of the one or more subchannels; and
the method further comprises:
selecting one or more subchannels of one or more buckets for use as a pilot based on the SNRs of the subchannels after equalizing the total bit loading of the plurality of buckets.

7. The method of claim 6, wherein selecting the one or more subchannels for use as a pilot comprises:
selecting a subchannel distributed to a bucket for use as a pilot for the bucket responsive to the subchannel having an SNR greater than a specified threshold.

8. The method of claim 7, wherein selecting the one or more subchannels for use as a pilot comprises selecting up to a specified maximum number of subchannels of a bucket for use as pilots.

9. The method of claim 1, wherein the OFDM transceiver device is in communication with the plurality of transmit nodes via a coaxial cable network.

10. The method of claim 1, wherein the OFDM transceiver device is in communication with the plurality of transmit nodes via a wireless network.

11. A device comprising:
a signaling interface to receive orthogonal frequency division multiplexing (OFDM) signaling for an OFDM channel from a plurality of transmit nodes;
an OFDM receiver coupled to the signaling interface, the OFDM receiver to process the OFDM signaling;
a channel allocation module coupled to the OFDM receiver, the channel allocation module to allocate a plurality of subchannels of the OFDM channel among the plurality of transmit nodes by:
determining a corresponding signal-to-noise ratio (SNR) for each of the plurality of subchannels for each transmit node of the plurality of transmit nodes;
assigning to each transmit node a corresponding subset of buckets of a plurality of buckets, the number of buckets in the subset based on a data rate requirement of the transmit node;
distributing the plurality of subchannels among the plurality of buckets based on the SNRs of the plurality of subchannels; and
for each transmit node, allocating to the transmit node the subchannels distributed to the subset of buckets assigned to the transmit node; and
an OFDM transmitter coupled to the signaling interface, the OFDM transmitter to transmit configuration information to the plurality of transmit nodes, the configuration information representing the allocation of the subchannels,
wherein the channel allocation module is to assign each transmit node a corresponding subset of buckets of the plurality of buckets by:
determining a least common multiple for the data rate requirements of the plurality of transmit nodes; and
for each transmit node, assigning a number of buckets based on the data rate requirement of the transmit node and the least common multiple.

12. A device comprising:
a signaling interface to receive orthogonal frequency division multiplexing (OFDM) signaling for an OFDM channel from a plurality of transmit nodes,
an OFDM receiver coupled to the signaling interface, the OFDM receiver to process the OFDM signaling;
a channel allocation module coupled to the OFDM receiver, the channel allocation module to allocate a plurality of subchannels of the OFDM channel among the plurality of transmit nodes by:
determining a corresponding signal-to-noise ratio (SNR) for each of the plurality of subchannels for each transmit node of the plurality of transmit nodes;
assigning to each transmit node a corresponding subset of buckets of a plurality of buckets, the number of buckets in the subset based on a data rate requirement of the transmit node;
distributing the plurality of subchannels among the plurality of buckets based on the SNRs of the plurality of subchannels; and for each transmit node, allocating to the transmit node the subchannels distributed to the subset of buckets assigned to the transmit node; and an OFDM transmitter coupled to the signaling interface, the OFDM transmitter to transmit configuration information to the plurality of transmit nodes, the configuration information representing the allocation of the subchannels; and wherein the channel allocation module is to distribute the plurality of subchannels among the plurality of buckets by:

maintaining a total bit loading of each bucket during distribution of the plurality of subchannels;

for a bucket with the lowest total bit loading:

selecting an available subchannel having the highest SNR for distribution to the bucket;

determining a bit loading of the selected subchannel; and         increasing the total bit loading of the bucket by the bit loading of the selected subchannel; and     repeating the selecting, determining, and increasing for the bucket with the lowest total bit loading at each repetition until every subchannel has been distributed.

13. The device of claim 12, wherein the channel allocation module further is to:

after distributing every subchannel to the plurality of buckets:

determine a lowest total bit loading of the plurality of buckets; and     equalize the total bit loading of the plurality of buckets to the lowest total bit loading by reducing the bit loading of each of one or more subchannels distributed to those buckets having a total bit loading greater than the lowest total bit loading.

14. The device of claim 13, wherein:

reducing the bit loading of each of the one or more subchannels for equalizing the total bit loading of the plurality of buckets reduces the SNRs of the one or more subchannels; and the channel allocation module further is to:

select one or more subchannels of one or more buckets for use as a pilot based on the SNRs of the subchannels after equalizing the total bit loading of the plurality of buckets.

15. The device of claim 14, wherein the channel allocation module is to select the one or more subchannels for use as a pilot by:

selecting a subchannel distributed to a bucket for use as a pilot for the bucket responsive to the subchannel having an SNR greater than a specified threshold.

16. The device of claim 15, wherein the channel allocation module is to select the one or more subchannels for use as a pilot by:

selecting up to a specified maximum number of subchannels of a bucket for use as pilots.

17. The device of claim 11, wherein the signaling interface comprises one of: a coaxial cable interface; and a wireless interface.

18. A non-transitory computer readable storage medium storing a set of executable instructions, the set of executable instructions to manipulate at least one processor to:

determine, for each transmit node of a plurality of transmit nodes, a corresponding signal-to-noise ratio (SNR) for each of a plurality of subchannels of an orthogonal frequency division multiplexing OFDM channel;

allocate the plurality of subchannels of the OFDM channel among the plurality of transmit nodes by:

assigning to each transmit node a corresponding subset of buckets of a plurality of buckets, the number of buckets in the subset based on a data rate requirement of the transmit node;

distributing the plurality of subchannels among the plurality of buckets based on the SNRs of the plurality of subchannels; and     for each transmit node, allocating to the transmit node the subchannels distributed to the subset of buckets assigned to the transmit node; and generate configuration information for transmission to the plurality of transmit nodes, the configuration information representing the allocation of the subchannels;

wherein the set of executable instructions to manipulate at least one processor to assign to each transmit node a corresponding subset of buckets of the plurality of buckets comprises executable instructions to manipulate at least one processor to:

determine a least common multiple for the data rate requirements of the plurality of transmit nodes; and     for each transmit node, assign a number of buckets based on the data rate requirement of the transmit node and the least common multiple.

\* \* \* \* \*